US009581213B2

(12) United States Patent
Lee

(10) Patent No.: US 9,581,213 B2
(45) Date of Patent: Feb. 28, 2017

(54) ROLLING BEARING AND SUSPENSION APPARATUS FOR AUTOMOBILE

(71) Applicant: HYNDAI MOBIS Co., Ltd., Yongin-si, Gyeonggi-do (KR)

(72) Inventor: Kye Ho Lee, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 1 day.

(21) Appl. No.: 14/662,336

(22) Filed: Mar. 19, 2015

(65) Prior Publication Data

US 2016/0223023 A1    Aug. 4, 2016

(30) Foreign Application Priority Data

Jan. 29, 2015    (KR) .................. 10-2015-0014512

(51) Int. Cl.
| | |
|---|---|
| *F16C 35/04* | (2006.01) |
| *F16F 1/12* | (2006.01) |
| *F16C 33/76* | (2006.01) |
| *F16C 35/06* | (2006.01) |
| *F16C 19/16* | (2006.01) |

(52) U.S. Cl.
CPC ............. *F16F 1/127* (2013.01); *F16C 19/163* (2013.01); *F16C 33/76* (2013.01); *F16C 35/06* (2013.01); *F16C 2220/04* (2013.01); *F16C 2326/05* (2013.01)

(58) Field of Classification Search
CPC .................. B60G 2204/418; B60G 2204/128; F16C 33/76; F16C 33/761; F16C 33/767; F16C 33/583; F16C 35/04; F16C 35/042; F16C 19/10; F16F 1/127
See application file for complete search history.

(56) References Cited

U.S. PATENT DOCUMENTS

| | | | | |
|---|---|---|---|---|
| 6,267,512 | B1 * | 7/2001 | Beghini ............... | B60G 15/068 384/607 |
| 8,109,492 | B2 * | 2/2012 | Winocur ............. | B60G 15/068 188/321.11 |
| 8,348,029 | B2 * | 1/2013 | Winocur ............. | B60G 15/068 188/322.12 |
| 2002/0003913 | A1 * | 1/2002 | Beghini ............... | B60G 15/063 384/609 |

(Continued)

FOREIGN PATENT DOCUMENTS

| | | |
|---|---|---|
| JP | 2006-162019 A | 6/2006 |
| JP | 2007-308137 A | 11/2007 |

(Continued)

OTHER PUBLICATIONS

Feb. 1, 2016, Korean Office Action for related KR application No. 10-2015-0014512.

*Primary Examiner* — Vishal Sahni
(74) *Attorney, Agent, or Firm* — Paratus Law Group, PLLC

(57) ABSTRACT

Provided are a rolling bearing and a suspension apparatus for an automobile enhanced in stiffness. To do so, in a rolling bearing and a suspension apparatus for an automobile according to an exemplary embodiment of the present invention, an upper cover's upward surface in contact with an upper case and an upper cover's peripheral surface in contact with the upper case are orthogonal to each other, and a length of the upward surface in a radial direction is longer than a length of the peripheral surface in a vertical direction.

9 Claims, 4 Drawing Sheets

(56) References Cited

U.S. PATENT DOCUMENTS

| | | | | |
|---|---|---|---|---|
| 2007/0267793 A1* | 11/2007 | Chamousset | ........ | B60G 15/068 267/220 |
| 2010/0014792 A1* | 1/2010 | Kellam | ................ | B60G 15/067 384/196 |
| 2011/0187071 A1* | 8/2011 | Corbett | ................ | B60G 15/068 280/124.155 |
| 2012/0146306 A1* | 6/2012 | Dubus | .................. | B60G 15/068 280/124.155 |
| 2013/0313766 A1* | 11/2013 | Bussit | ................. | B60G 15/068 267/195 |
| 2014/0023307 A1* | 1/2014 | Stautner | ................ | F16C 33/583 384/615 |

FOREIGN PATENT DOCUMENTS

| | | |
|---|---|---|
| KR | 10-1092523 B1 | 12/2011 |
| KR | 10-1300084 B1 | 8/2013 |

* cited by examiner

ROLLING BEARING AND SUSPENSION APPARATUS FOR AUTOMOBILE

CROSS-REFERENCE TO RELATED APPLICATIONS

The present application claims priority to Korean Patent Application Number 10-2015-0014512 filed Jan. 29, 2015, the entire contents of which application is incorporated herein for all purposes by this reference.

TECHNICAL FIELD

The present invention relates to a rolling bearing and a suspension apparatus for an automobile.

BACKGROUND

In general, a suspension for an automobile is provided between a chassis of the automobile and a wheel and configured to elastically support a load of the chassis of the automobile and absorb vibration transferred from the wheel to the chassis of the automobile.

As one example of the suspension for an automobile, Macpherson type suspension includes a shock absorber. The shock absorber includes a strut tube connected to the wheel and a strut rod provided to be vertically movable within the strut tube and connected to the chassis of the automobile. When the strut rod is inserted into the strut tube by vibration transferred from the wheel to the chassis of the automobile, a shock is absorbed.

Further, a lower spring sheet is fixed at a peripheral surface of the strut tube, an insulator configured to connect the strut rod to the chassis of the automobile is combined with an upper end of the strut rod, and a rolling bearing is provided under the insulator. Furthermore, an upper spring sheet is arranged under the rolling bearing. A coil-shaped spring is provided between the upper spring sheet and the lower spring sheet. When the shock absorber is operated, the spring is compressed and thus absorbs the vibration.

SUMMARY

The present invention has been made in an effort to provide a rolling bearing and a suspension apparatus for an automobile enhanced in stiffness.

Objects of the present invention are not limited to the objects described above, and other objects that are not described will be clearly understood by a person of ordinary skill in the art from the description below.

An exemplary embodiment of the present invention provides a rolling bearing including: an upper cover; a lower cover; a ring member arranged to be rotatable between the upper cover and the lower cover; an upper case arranged at an outer surface of the upper cover; and a lower case arranged at an outer surface of the lower cover and combined with the upper case, wherein in the upper cover, an upward surface in contact with the upper case and a peripheral surface in contact with the upper case are orthogonal to each other, and a length of the upward surface in a radial direction is longer than a length of the peripheral surface in a vertical direction.

Further, an exemplary embodiment of the present invention provides a suspension apparatus for an automobile including: a strut tube; a strut rod provided to be movable within the strut tube; a lower spring sheet combined with a peripheral surface of the strut tube; a spring mounted on the lower spring sheet; an upper spring sheet mounted on an upper end of the spring; an insulator combined with the strut rod and a chassis of the automobile to connect the strut rod to the chassis of the automobile; and a rolling bearing provided between the upper spring sheet and the insulator, wherein the rolling bearing includes: an upper cover; a lower cover; a ring member arranged to be rotatable between the upper cover and the lower cover; an upper case arranged between the insulator and the upper cover; and a lower case arranged between the upper spring sheet and the lower cover and combined with the upper case, and in the upper cover, an upward surface in contact with the upper case and a peripheral surface in contact with the upper case are orthogonal to each other, and a length of the upward surface in a radial direction is longer than a length of the peripheral surface in a vertical direction.

Details of other exemplary embodiments are included in the detailed description and the drawings.

According to the rolling bearing and the suspension apparatus for an automobile of the present invention, since the upward surface in contact with the upper case and the peripheral surface of the upper cover in contact with the upper case are orthogonal to each other and the length of the upward surface in a radial direction is longer than the length of the peripheral surface in a vertical direction, there is the effect of enhancing stiffness in an axial direction.

Further, since an upward surface of the upper case is formed slantly in the radial direction with respect to the upward surface of the upper cover, there is the effect of enhancing stiffness in the radial direction.

Furthermore, since the upper cover and the upper case are formed as one body, there is the effect of making it easy to assembly the rolling bearing.

Also, since the upper cover and the upper case are formed as one body with an elastic member of the insulator, there is the effect of making it easy to assembly the rolling bearing and the insulator.

The effects of the present invention are not limited to the effects described above, and a person of ordinary skill in the art will clearly understand other effects that are not described from the description of the scope of the claims.

DETAILED DESCRIPTION

Figure 1:
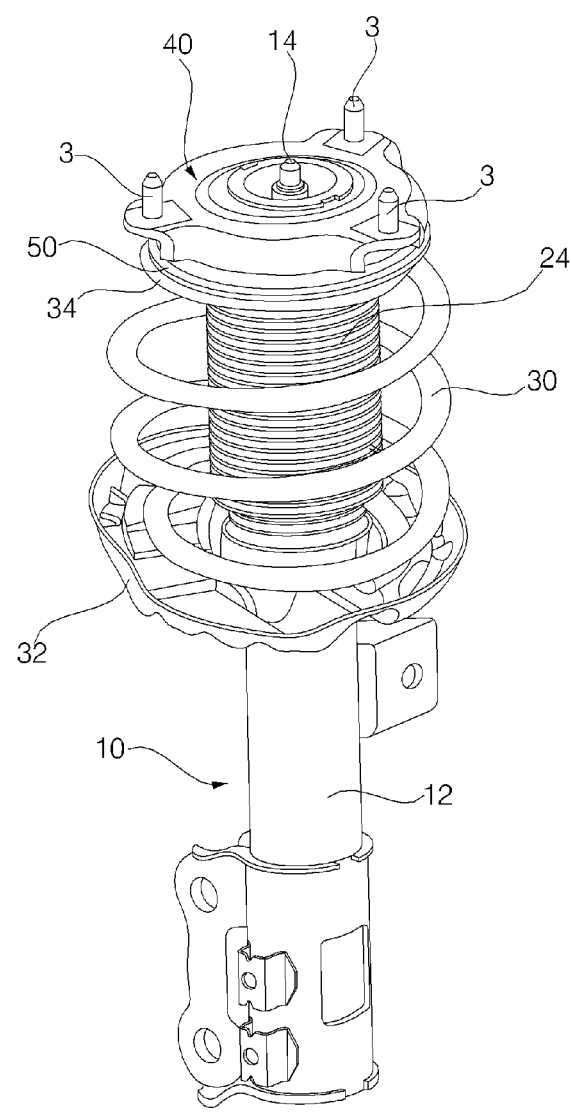
FIG. 1 is a perspective view illustrating a suspension apparatus for an automobile according to an exemplary embodiment of the present invention.

The advantages and characteristics of the present invention and methods for achieving the same will become clear from the embodiments set forth in detail below with reference to the attached drawings. However, the present invention is not limited to the embodiments set forth below, and may be embodied in various other forms. The present embodiments are for rendering the description of the present invention complete and are set forth to provide a complete understanding of the scope of the invention to a person of ordinary skill in the technical field to which the present invention pertains, and the present invention will only be defined by the scope of the claims. Like reference numerals represent like elements throughout the specification.

Hereinafter, a rolling bearing and a suspension apparatus for an automobile according to exemplary embodiments of the present invention will be described in more detail with reference to the drawings.

Figure 2:
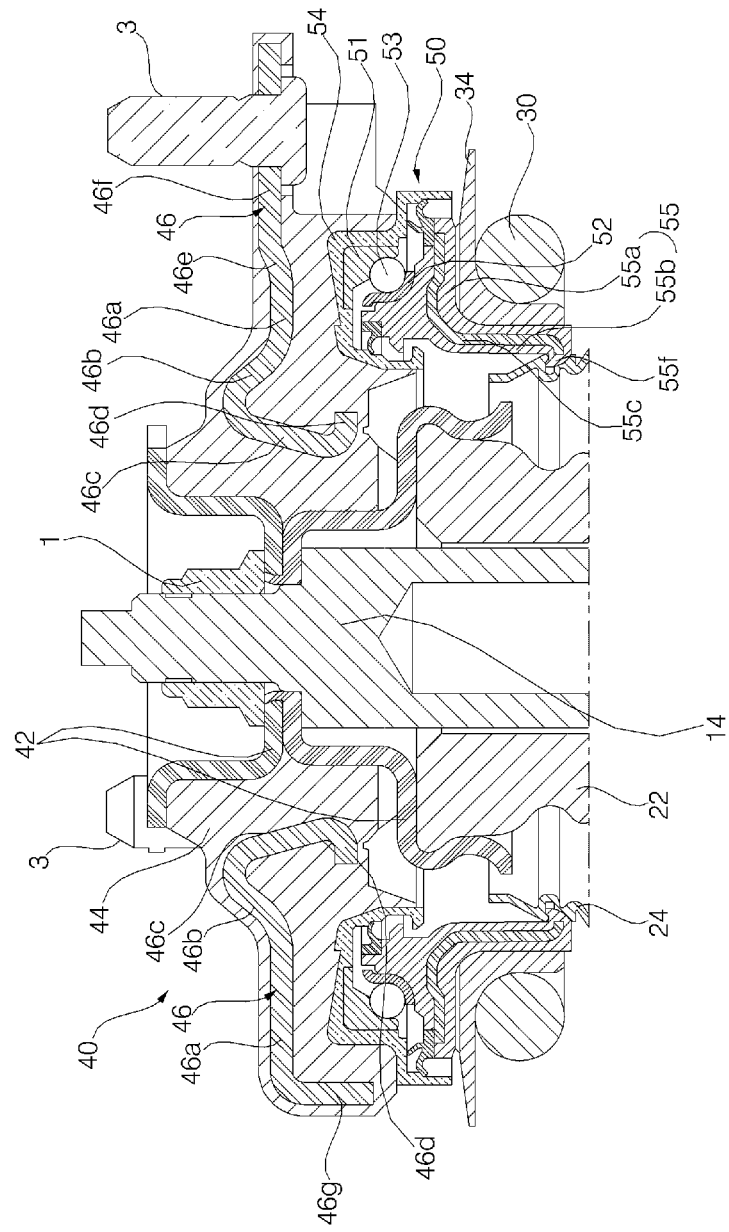
FIG. 2 is a cross-sectional view illustrating an upper part of FIG. 1.

FIG. 1 is a perspective view illustrating a suspension apparatus for an automobile according to an exemplary embodiment of the present invention, and FIG. 2 is a cross-sectional view illustrating an upper part of FIG. 1.

Referring to FIG. 1 and FIG. 2, a suspension apparatus for an automobile according to an exemplary embodiment of the present invention includes a shock absorber 10, a spring 30 provided at an outer peripheral surface of the shock absorber 10, and an insulator 40 configured to connect the shock absorber 10 to a chassis of the automobile.

The shock absorber 10 includes a strut tube 12 connected to a wheel and a strut rod 14 of which a lower end is inserted into the strut tube 12 and combined with the strut tube 12 so as to be vertically movable. The inside of the strut tube 12 is filled with oil, and an upper end of the strut rod 14 is connected to the chassis of the automobile through the insulator 40. An oil pressure is generated within the strut tube 12 when a lower end portion of the strut rod 14 is inserted into the strut tube 12 by vibration transferred from the wheel to the chassis of the automobile, and the vibration is absorbed by the oil pressure.

A bump stopper 22 is combined with an outer peripheral surface of the strut rod 14, and a dust cover 24 is arranged at an outer peripheral surface of the bump stopper 22.

A lower spring sheet 32 is fixed to an outer peripheral surface of the strut tube 12. Further, an upper spring sheet 34 is arranged at the outer peripheral surface of the strut rod 14 so as to be spaced from the outer peripheral surface of the strut rod 14. The upper spring sheet 34 is mounted on an upper end of the spring 30.

The spring 30 is formed into a coil shape and arranged between the upper spring sheet 34 and the lower spring sheet 32. That is, a lower end of the spring 30 is mounted on the lower spring sheet 32 and the upper end of the spring 30 is in contact with the bottom of the upper spring sheet 34 so as to support the upper spring sheet 34. When the lower end portion of the strut rod 14 is inserted into the strut tube 12, the spring 30 is compressed and thus absorbs the vibration.

The insulator 40 is combined with an upper end portion of the strut rod 14 and configured to connect the strut rod 14 to the chassis of the automobile. The insulator 40 includes a pair of cup members 42 into which the upper end of the strut rod 14 is inserted to be combined therewith, an elastic member 44 having elasticity and combined with an outer peripheral surfaces of the pair of cup members 42, and a connection member 46 combined with the inside of the elastic member 44.

The pair of cup members 42 may be arranged in cup shapes of which bottom surfaces face each other. That is, a lower cup member of the pair of cup members 42 is formed into a cup standing upside down and has an open bottom. Further, an upper cup member of the pair of the cup members 42 is formed into a cup standing up straight and has an open top.

The upper end portion of the strut rod 14 is inserted into the lower cup member 42 so as to penetrate through the middle of the pair of cup members 42 and then protruded from the open top of the upper cup member 42. The protruded upper end portion of the strut rod 14 is clamped with a nut 1, so that the insulator 40 is combined with the upper end portion of the strut rod 14. In this state, the bump stopper 22 is inserted into the lower cup member 42. Further, a lower end of the lower cup member 42 is inserted into the dust cover 24 so as to be arranged between the bump stopper 22 and the dust cover 24.

In order to absorb vibration transferred from the wheel to the chassis of the automobile, the elastic member 44 is formed of a rubber material having elasticity capable of absorbing the vibration while being deformed in an axial direction and a radial direction when the shock absorber 10 and the spring 30 are operated. That is, the elastic member 44 attenuates the vibration transferred to the chassis of the automobile by supporting a load of the chassis of the automobile.

The connection member 46 is arranged within the elastic member 44. The connection member 46 is formed of a harder material than the elastic member 44. For example, the connection member 46 may be formed of steel or engineering plastic. When the elastic member 44 made of a rubber material is molded in a mold, the connection member 46 may be inserted into the mold to form the elastic member 44 and the connection member 46 as one body. In order to form the elastic member 44 and the connection member 46 as one body within the mold, preferably, the connection member 46 may be formed of a metal material having a higher heat distortion temperature than the elastic member 44.

The connection member 46 is combined with the chassis of the automobile through a clamping member 3 such as a screw and thus enables the insulator 40 to connect the strut rod 14 to the chassis of the automobile.

In the connection member 46, a part connected to the chassis of the automobile through the clamping member 3 is formed into a different shape from a part where the clamping member 3 is not disposed. That is, it can be seen that a cross-sectional shape of the connection member 46 as illustrated on the right side of FIG. 2 is different from a cross-sectional shape of the connection member 46 as illustrated on the left side of FIG. 2.

A cross-sectional shape of the connection member 46 will be briefly described below.

The connection member 46 at the part combined with the chassis of the automobile through the clamping member 3 includes: a first horizontal portion 46a horizontally arranged in a radial direction; a first slanting portion 46b upwardly slanted and extended from an inner end of the first horizontal portion 46a toward an inside; a second slanting portion 46c downwardly slanted and extended from an inner end of the first slanting portion 46b toward an inside; a second horizontal portion 46d horizontally extended from a lower end of the second slanting portion 46c toward an outside; a third slanting portion 46e upwardly slanted and extended from an outer end of the first horizontal portion 46a toward an outside; and a third horizontal portion 46f horizontally extended from an outer end of the third slanting portion 46e and combined with the chassis of the automobile through the clamping member 3.

Further, the connection member 46 at the part where the clamping member 3 is not disposed includes; a first horizontal portion 46a horizontally arranged in a radial direction; a first slanting portion 46b upwardly slanted and extended from an inner end of the first horizontal portion 46a toward an inside; a second slanting portion 46c downwardly slanted and extended from an inner end of the first slanting portion 46b toward an inside; a second horizontal portion 46d horizontally extended from a lower end of the second slanting portion 46c toward an outside; and a vertical portion 46g downwardly and vertically extended from an outer end of the first horizontal portion 46a.

In order for the elastic member 44 to absorb vibration while being deformed in the axial direction and in the radial direction, a rolling bearing 50 for assisting the elastic member 44 in deformation is arranged under the insulator 40. The rolling bearing 50 is arranged between the upper spring sheet 34 and the insulator 40.

Hereinafter, the rolling bearing 50 will be described in detail.

Figure 3:
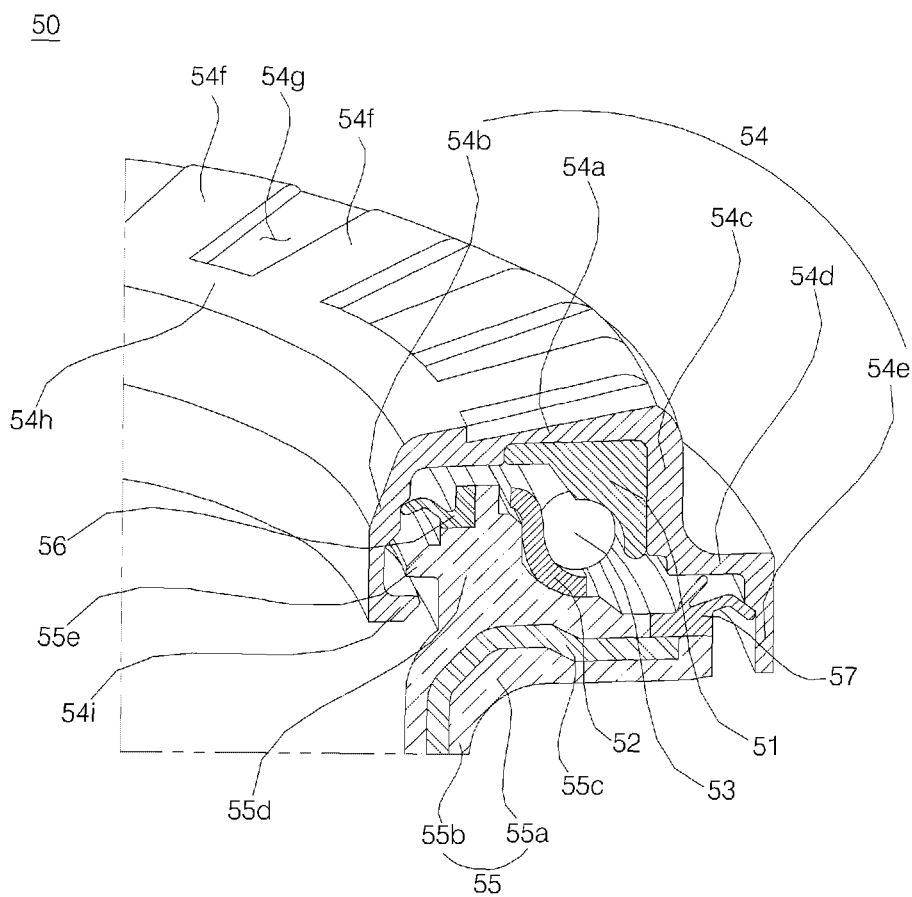
FIG. 3 is an incised perspective view illustrating a rolling bearing illustrated in FIG. 1 and FIG. 2.

FIG. 3 is an incised perspective view illustrating the rolling bearing 50 illustrated in FIG. 1 and FIG. 2.

Referring to FIG. 1 to FIG. 3, the rolling bearing 50 includes an upper cover 51; a lower cover 52; a ring member 53 arranged to be rotatable between the upper cover 51 and the lower cover 52; an upper case 54 arranged at an outer surface of the upper cover 51; and a lower case 55 arranged at an outer surface of the lower cover 52 and combined with the upper case 54.

The ring member 53 is formed to have a circular cross section and surrounded by the upper cover 51 and the lower cover 52. The upper cover 51 and the lower cover 52 have curved surfaces surrounding the ring member 53, and, thus, when the rolling bearing 50 receives a load from the insulator 40, the ring member 53 can make a rolling movement between the upper cover 51 and the lower cover 52. Since inner surfaces of the upper cover 51 and the lower cover 52 surrounding the ring member 53 are filled with lubricating oil, the rolling bearing 50 can be deformed by a stress of the elastic member 44 of the insulator 40 when the elastic member 44 is deformed.

The upper case 54 is combined with a lower surface of the elastic member 44, and a part of the lower case 55 is inserted into the upper spring sheet 34 and the other part is mounted on the upper spring sheet 34.

The upper cover 51, the lower cover 52, and the ring member 53 are formed of a metal material. In the present exemplary embodiment, the upper cover 51, the lower cover 52, and the ring member 53 are formed of a steel material. The upper cover 51, the lower cover 52, and the ring member 53 may also be formed of an aluminum material, a steel alloy, or an aluminum alloy.

The upper case 54 and the lower case 55 are formed of a polymer compound. In the present exemplary embodiment, the upper case 54 and the lower case 55 are formed of a hard plastic material. The upper case 54 and the lower case 55 may also be formed of a soft plastic material.

The upper cover 51 and the upper case 54 are formed as one body. After the upper cover 51 is molded first, when the upper case 54 is molded in a mold, the upper cover 51 may be inserted into the mold to form the upper cover 51 and the upper case 54 as one body. In order to form the upper cover 51 and the upper case 54 as one body within the mold, preferably, the upper cover 51 may be formed of a metal material which is heat-distorted at a higher temperature than the upper case 54.

As described above, since the upper cover 51 and the upper case 54 is formed as one body, it is not necessary to separately assembly the upper cover 51 and the upper case 54. Thus, it becomes simple to assembly the rolling bearing 50.

Further, the elastic member 44 and the upper case 54 are also formed as one body. That is, in the present exemplary embodiment, since the upper cover 51 and the upper case 54 are formed as one body, the elastic member 44, the upper cover 51, and the upper case 54 are formed as one body. After the upper cover 51 and the upper case 54 are first formed as one body, when the elastic member 44 is molded in a mold, the upper cover 51 and the upper case 54 formed as one body are inserted into the mold to form the elastic member 44, the upper cover 51, and the upper case 54 as one body. In order to form the elastic member 44, the upper cover 51, and the upper case 54 as one body within the mold, preferably, the upper case 54 may be formed of a plastic material which is heat-distorted at a higher temperature than elastic member 44.

As described above, since the elastic member 44, the upper cover 51, and the upper case 54 are formed as one body, it is not necessary to separately assembly the insulator 40 and the rolling bearing 50. Thus, it becomes simple to assembly the insulator 40 and the rolling bearing 50.

A reinforcing member 55c configured to reinforce stiffness of the lower case 55 may be arranged within the lower case 55. The reinforcing member 55c may be formed of a steel material harder than the lower case 55. In this case, when the lower case 55 formed of a plastic material is molded in a mold, the reinforcing member 55c may be inserted into the mold to form the lower case 55 and the reinforcing member 55c as one body. In order to form lower case 55 and the reinforcing member 55c as one body within the mold, preferably, the reinforcing member 55c may be formed of a metal material which is heat-distorted at a higher temperature than lower case 55.

In the upper cover 51, an upward surface in contact with the upper case 54 is horizontally formed and a peripheral surface in contact with the upper case 54 is vertically formed. That is, in the upper cover 51, the upward surface in contact with the upper case 54 and the peripheral surface in contact with the upper case 54 are orthogonal to each other. Further, in the upper cover 51, a length in a radial direction of the upward surface in contact with the upper case 54 is longer than a length in a vertical direction of the peripheral surface in contact with the upper case 54. Therefore, the upper cover 51 can secure stiffness sufficient to support a load in an axial direction from the upper case 54, and, thus, it is not necessary to install a reinforcing member for supporting a load in an axial direction within the elastic member 44. Further, in the upper cover 51, the upward surface in contact with the upper case 54 is horizontally formed and the peripheral surface in contact with the upper case 54 is vertically formed, and, thus, when the upper case 54 is formed as one body with the elastic member 44, the upper cover 51 can bear a heat distortion stress applied to the upper case 54. Therefore, it is possible to prevent deformation of the upper case 54.

Further, an upward surface of the upper case 54 is formed slantly in a radial direction with respect to the upward surface of the upper cover 51. In the present exemplary embodiment, since the upward surface of the upper case 54 is formed slantly in the radial direction with respect to the upward surface of the upper cover 51, an outside is higher than an inside. Therefore, the upper case 54 softly maintains a load in an axial direction from the elastic member 44 of the insulator 40 and secures stiffness sufficient to support a load in a radial direction. The upward surface of the upper case 54 may also be formed slantly in the radial direction with respect to the upward surface of the upper cover 51 such that the inside is higher than the outside.

The upward surface of the upper case 54 includes one or more protrusions 54f and 54h and one or more grooves 54g. The protrusions 54f and 54h are upwardly protruded as compared with the grooves 54g. The protrusions 54f and 54h include a first protrusion 54h annularly formed along an inner circumference of the upward surface of the upper case 54 and second protrusions 54f extended in a radial direction from the first protrusion 54h.

The upward surface of the upper case 54 has an increased contact area with the elastic member 44 of the insulator 40 due to the protrusions 54f and 54h and the grooves 54g, and, thus, when the upper case 54 is molded as one body with the elastic member 44, adhesion strength is increased. In the present exemplary embodiment, the multiple second protrusions 54f are spaced from each other along the circumference. Therefore, the grooves 54g are formed between the multiple second protrusions 54f, and an inner end of the groove 54g is blocked by the first protrusion 54h and an outer end thereof is opened.

The upper case 54 includes: an upper portion 54a constituting the upward surface of the upper case 54; an inner portion 54b downwardly extended from an inner end of the upper portion 54a; a first outer portion 54c downwardly and vertically extended from an outer end of the upper portion 54a; a second outer portion 54d horizontally extended in a radial direction from a lower end of the first outer portion 54c; and a third outer portion 54e downwardly and vertically extended from an outer end of the second outer portion 54d.

A first protrusion 54i for combining with the lower case 55 is protruded from an outer surface of a lower end of the inner portion 54b.

The upward surface of the upper cover 51 is in contact with an inner surface of the upper portion 54a, and the peripheral surface of the upper cover 51 is in contact with an inner surface of the first outer portion 54c.

A combination protrusion 55d inserted into the upper case 54 and combined with the upper case 54 is formed at an upward surface of the lower case 55. A second protrusion 55e engaged with the first protrusion 54i is protruded from an inner surface of the combination protrusion 55d such that the combination protrusion 55d can be combined with the upper case 54.

The upper case 54 is combined with the inner surface of the combination protrusion 55d and the lower cover 53 is combined with an outer surface of the combination protrusion 55d.

The lower case 55 includes an upper portion 55a combined with the upper case 54 and the lower cover 53 and an inner portion 55b downwardly extended from an inner end of the upper portion 55a. The upper portion 55a is mounted on the upper spring sheet 34, and the inner portion 55b is inserted into the upper spring sheet 34 so as to be caught by an outer surface of the dust cover 24. In order for the inner portion 55b to be caught by the outer surface of the dust cover 24, the third protrusion 55f to be caught by a corrugation portion of the dust cover 24 is protruded from a lower inner surface of the inner portion 55b.

The rolling bearing 50 according to an exemplary embodiment of the present invention further includes sealing members 56 and 57 for sealing a space between the upper case 54 and the lower case 55.

The sealing members 56 and 57 include a first sealing member 56 for sealing a space between an upward surface of the combination protrusion 55d and the upper case 54 and a second sealing member 57 for sealing a space between an edge of the upward surface of the lower case 55 and the upper case 54.

The upper cover 51 and the lower cover 52 are arranged such that a contact surface therebetween is slanted. Therefore, lubricating oil filled between the upper cover 51 and the lower cover 52 may leak through a left side and a right side of the contact surface between the upper cover 51 and the lower cover 52.

The first sealing member 56 is arranged to be adjacent to left ends of the upper cover 51 and the lower cover 52, and the second sealing member 57 is arranged to be adjacent to right ends of the upper cover 51 and the lower cover 52. Thus, when the lubricating oil filled between the upper cover 51 and the lower cover 52 may be leaked to the outside of the upper cover 51 and the lower cover 52, the lubricating oil can be suppressed from being leaked to the outside of the upper case 54 and the lower case 55.

Meanwhile, the protrusions 54f and 54h and the grooves 54g formed at the upper case 54 are designed to enhance adhesion strength with respect to the elastic member 44. It is exemplified in the present exemplary embodiment that the protrusions 54f and 54h and the grooves 54g are formed only at the upward surface of the upper case 54, but it is not limited thereto, and the protrusions 54f and 54h and the grooves 54g may be further formed at an outer peripheral surface of the upper case 54. Details thereof will be described with reference to FIG. 4 and FIG. 5.

Figure 4:
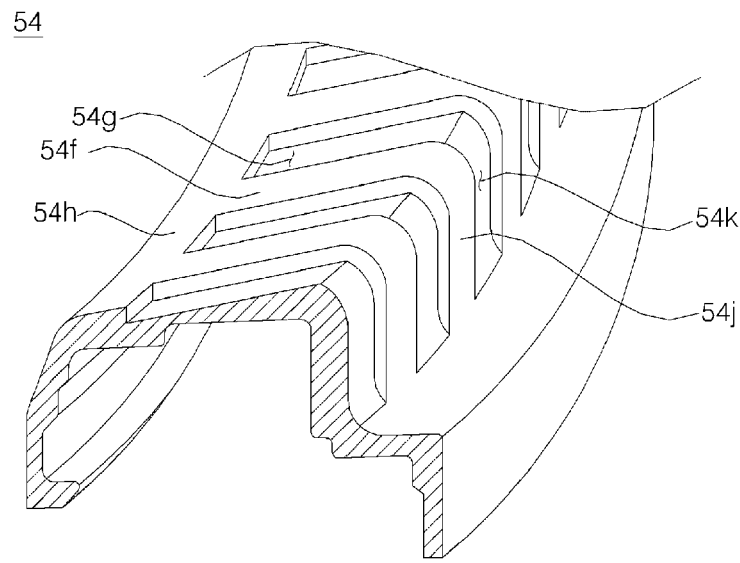
FIG. 4 is a diagram illustrating another exemplary embodiment of an upper case.

FIG. 4 is a diagram illustrating another exemplary embodiment of an upper case. Herein, the same components as those of the upper case 54 illustrated in FIG. 3 will be respectively assigned the same reference numerals, and details thereof will be omitted and only differences will be described.

Referring to FIG. 4, it can be seen that the upper case 54 is different from one illustrated in FIG. 3. That is, one or more third protrusions 54j and one or more second grooves 54k are further formed at the outer peripheral surface of the upper case 54. The third protrusions 54j are further protruded than the second grooves 54k in a radial direction.

The third protrusions 54j are extended from the second protrusions 54f formed at the upward surface of the upper case 54, and the second grooves 54k are extended from the grooves 54g formed at the upward surface of the upper case 54.

Figure 5:
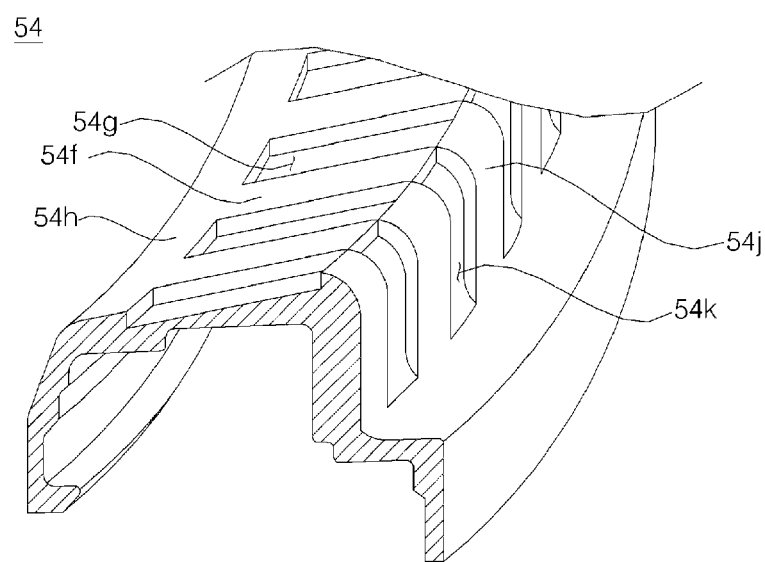
FIG. 5 is a diagram illustrating still another exemplary embodiment of an upper case.

FIG. 5 is a diagram illustrating still another exemplary embodiment of an upper case. Herein, the same components as those of the upper case 54 illustrated in FIG. 4 will be respectively assigned the same reference numerals, and details thereof will be omitted and only differences will be described.

Referring to FIG. 5, it can be seen that the upper case 54 is different from one illustrated in FIG. 4. That is, although the third protrusions 54j are extended from the second protrusions 54f and the second grooves 54k are extended from the grooves 54g in FIG. 4, the third protrusions 54j are extended from the grooves 54g and the second grooves 54k are extended from the second protrusions 54f herein.

As described above, in the rolling bearing and the suspension apparatus for an automobile according to the present invention, the upper cover 51's upward surface in contact with the upper case 54 and the upper cover 51's peripheral surface in contact with the upper case 54 are orthogonal to each other, and a length of the upward surface in a radial direction is longer than a length of the peripheral surface in a vertical direction. Thus, stiffness in the axial direction is enhanced.

Further, since the upward surface of the upper case 54 is formed slantly in the radial direction with respect to the upward surface of the upper cover 51, stiffness in the radial direction is also enhanced.

Furthermore, since the upper cover 51 and the upper case 54 are formed as one body, it becomes easy to assembly the rolling bearing 50.

Also, since the upper case 54 is formed as one body with an elastic member 44 of the insulator 40 it becomes easy to assembly the rolling bearing 50 an the insulator 40.

The above description of the present invention is provided for the purpose of illustration, and it would be understood by a person of ordinary skill in the art that various changes and modifications may be made without changing technical conception and essential features of the present invention. Thus, it is clear that the above-described embodiments are illustrative in all aspects and do not limit the present invention. The scope of the present invention is defined by the following claims rather than by the detailed description of the embodiment. It shall be understood that all modifications and embodiments conceived from the meaning and scope of the claims and their equivalents are included in the scope of the present invention.

What is claimed is:

1. A suspension apparatus for an automobile comprising:
a strut tube;
a strut rod provided to be movable within the strut tube;
a lower spring sheet combined with a peripheral surface of the strut tube;
a spring mounted on the lower spring sheet;
an upper spring sheet mounted on an upper end of the spring;
an insulator combined with the strut rod and a chassis of the automobile to connect the strut rod to the chassis of the automobile; and
a rolling bearing provided between the upper spring sheet and the insulator,
wherein the rolling bearing includes:
an upper cover;
a lower cover;
a ring member arranged to be rotatable between the upper cover and the lower cover;
an upper case arranged between the insulator and the upper cover; and
a lower case arranged between the upper spring sheet and the lower cover and combined with the upper case,
wherein an upward surface of the upper cover which is in contact with the upper case and a peripheral surface of the upper cover which is in contact with the upper case are orthogonal to each other, and a length of the upward surface of the upper cover in a radial direction is longer than a length of the peripheral surface of the upper cover in a vertical direction, and
wherein the upper case includes an upper portion including a bottom surface in direct contact with the upward surface of the upper cover and positioned immediately on and above the upward surface of the upper cover and a slant top surface opposite to the bottom surface and upwardly inclined with respect to the bottom surface in the radial direction toward an outer peripheral surface of the upper case such that the upper portion of the upper case has a thickness gradually increasing in the radial direction toward the outer peripheral surface of the upper case,
wherein the insulator includes:
a cup member into which an upper end of the strut rod is inserted to be combined with the strut rod;
an elastic member which is combined with a peripheral surface of the cup member and of which a downward surface is combined with the upper case; and
a connection member combined with an inside of the elastic member and combined with the chassis of the automobile through a clamping member,
wherein the connection member includes:
a first horizontal portion horizontally arranged in a radial direction;
a first slanting portion upwardly slanted and extended from an inner end of the first horizontal portion toward an inside;
a second slanting portion downwardly slanted and extended from an inner end of the first slanting portion toward an inside;
a second horizontal portion horizontally extended from a lower end of the second slanting portion toward an outside;
a third slanting portion upwardly slanted and extended from an outer end of the first horizontal portion toward an outside; and
a third horizontal portion horizontally extended from an outer end of the third slanting portion and combined with the chassis of the automobile through the clamping member.

2. The suspension apparatus for an automobile of claim 1, wherein the upper cover, the upper case, and the elastic member are made of materials different from one another and formed as a unitary body.

3. The suspension apparatus for an automobile of claim 1, wherein the top surface of the upper case includes one or more protrusions and one or more grooves.

4. The suspension apparatus for an automobile of claim 3, wherein the protrusions include a first protrusion annularly formed along a circumference of the top surface of the upper case and multiple second protrusions extended in a radial direction from the first protrusion, and the grooves are arranged between multiple second protrusions.

5. The suspension apparatus for an automobile of claim 3, wherein one or more third protrusions and one or more second grooves are further formed at the outer peripheral surface of the upper case.

6. The suspension apparatus for an automobile of claim 1, wherein the upper case includes:
the upper portion constituting an upward surface of the upper case;
an inner portion downwardly extended from an inner end of the upper portion;
a first outer portion downwardly extended from an outer end of the upper portion;
a second outer portion extended in a radial direction from a lower end of the first outer portion; and
a third outer portion downwardly extended from an outer end of the second outer portion.

7. The suspension apparatus for an automobile of claim 1, further comprising:
a reinforcing member arranged within the lower case and configured to reinforce stiffness of the lower case.

8. The suspension apparatus for an automobile of claim 1, wherein a combination protrusion inserted into the upper case and combined with the upper case is formed at an upward surface of the lower case.

9. The suspension apparatus for an automobile of claim 8, further comprising:
a first sealing member for sealing a space between an upward surface of the combination protrusion and the upper case; and a second sealing member for sealing a space between an edge of the upward surface of the lower case and the upper case.

* * * * *